United States Patent
Wu et al.

(10) Patent No.: US 10,461,654 B2
(45) Date of Patent: Oct. 29, 2019

(54) POWER SUPPLY LIGHT LOAD EFFICIENCY CONTROL CIRCUIT

(71) Applicant: Dell Products, LP, Round Rock, TX (US)

(72) Inventors: Chi-Che Wu, Taipei (TW); Wei-Cheng Yu, New Taipei (TW); Yung Chang Chang, New Taipei (TW); Ya-Tang Hsieh, Taipei (TW)

(73) Assignee: Dell Products, LP, Round Rock, TX (US)

( * ) Notice: Subject to any disclaimer, the term of this patent is extended or adjusted under 35 U.S.C. 154(b) by 225 days.

(21) Appl. No.: 15/586,814

(22) Filed: May 4, 2017

(65) Prior Publication Data
US 2018/0321734 A1 Nov. 8, 2018

(51) Int. Cl.
*H02M 3/335* (2006.01)
*H02M 3/337* (2006.01)
*G06F 1/28* (2006.01)
*G06F 1/30* (2006.01)
*H02M 1/00* (2006.01)

(52) U.S. Cl.
CPC ............ *H02M 3/3376* (2013.01); *G06F 1/28* (2013.01); *G06F 1/305* (2013.01); *H02M 2001/0032* (2013.01); *H02M 2001/0058* (2013.01)

(58) Field of Classification Search
CPC ......... H02M 3/337; H02M 2001/0032; H02M 2001/0074; G06F 1/3282; G06F 1/3296; H02H 7/20
USPC ... 363/65, 21.02, 21.04, 21.07, 21.13, 21.17
See application file for complete search history.

(56) References Cited

U.S. PATENT DOCUMENTS

| | | | |
|---|---|---|---|
| 6,944,034 B1 * | 9/2005 | Shteynberg | H02M 1/4258 323/282 |
| 6,952,354 B1 | 10/2005 | Yang | |
| 7,061,779 B2 | 6/2006 | Yang | |
| (Continued) | | | |

*Primary Examiner* — Rajnikant B Patel
(74) *Attorney, Agent, or Firm* — Prol Intellectual Property Law, PLLC; H. Kenneth Prol (57) ABSTRACT

A system and method of operating an a power supply unit with a light load efficiency control system comprising a power regulator circuit for receiving an alternating current (AC) input voltage from within a range of accommodated AC input voltages and including a power factor correction (PFC) circuit and an LLC resonator circuit having a bulk capacitance voltage level and operable to receive the input AC voltage in the power supply unit and where the power supply unit generates a direct current (DC) output voltage for use by a load. The power supply unit having a processor logic core for the power regulator circuit to control a plural stage bulk capacitor voltage level having at least a high step bulk capacitor voltage level for operation when a normal load is applied to the power supply unit and a low step bulk capacitor voltage level for operation under light load conditions and a light load control circuit for receiving a control input voltage representative of the AC input voltage received by the power supply unit, comparing via a comparator circuit the control input voltage to a reference voltage generated to represent a threshold level of AC input voltage, and activating a light load control feedback signal to the processor logic core if the control input voltage exceeds the reference voltage level under light load operating conditions.

20 Claims, 7 Drawing Sheets

(56) References Cited

U.S. PATENT DOCUMENTS

| | | |
|---|---|---|
| 7,885,085 B2 | 2/2011 | Orr |
| 7,911,812 B2 | 3/2011 | Colbeck |
| 8,169,799 B2 | 5/2012 | Takeuchi |
| 8,194,419 B2 * | 6/2012 | Ryu .................... H02M 1/4208 |
| | | 363/21.04 |
| 8,284,571 B2 | 10/2012 | Colbeck |
| 8,300,429 B2 | 10/2012 | Orr |
| 8,330,293 B2 | 12/2012 | Brown |
| 8,514,591 B2 * | 8/2013 | Lee ................... H02M 3/33507 |
| | | 363/21.01 |
| 8,582,319 B2 * | 11/2013 | Reinberger ......... H02M 3/3376 |
| | | 323/207 |
| 8,941,365 B2 | 1/2015 | Murdock |
| 9,036,386 B2 | 5/2015 | Earanky |
| 9,054,597 B2 | 6/2015 | Zhao |
| 9,295,117 B2 * | 3/2016 | Acatrinei ........... H05B 33/0815 |
| 9,601,990 B2 | 3/2017 | Jin |
| 9,614,432 B2 | 4/2017 | Takata |
| 9,698,670 B2 | 7/2017 | Takata |
| 9,742,261 B2 | 8/2017 | Young |
| 2009/0225575 A1 * | 9/2009 | Vinciarelli ............ H02M 3/157 |
| | | 363/125 |
| 2009/0310386 A1 | 12/2009 | Takeuchi |
| 2010/0080026 A1 | 4/2010 | Zhang |
| 2011/0273118 A1 | 11/2011 | Bonner |
| 2013/0043846 A1 | 2/2013 | Murdock |
| 2013/0223119 A1 | 8/2013 | Zhao |
| 2014/0043877 A1 | 2/2014 | Ishii |
| 2015/0102786 A1 | 4/2015 | Kim |
| 2015/0229204 A1 * | 8/2015 | Mao ..................... H02M 7/217 |
| | | 327/109 |
| 2015/0364988 A1 | 12/2015 | Lu |
| 2016/0036318 A1 | 2/2016 | Young |
| 2016/0344281 A1 | 11/2016 | Choudhury |

* cited by examiner

POWER SUPPLY LIGHT LOAD EFFICIENCY CONTROL CIRCUIT

FIELD OF THE DISCLOSURE

The present disclosure generally relates to information handling systems, and more particularly relates to a system for managing light load operation and power efficiency of a regulated power supply unit providing output voltage to a load such as an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components. The information handling system may include telecommunication, network communication, and video communication capabilities. Further, the information handling system may include or be connected to a power supply unit with a voltage regulator circuit including a protection circuit to protect downstream components.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Efficiency standards for power delivery and utilization efficiency of power by consumer products help to define levels of power dissipation or loss as required for operation of power supply units in connection with information handling systems. In one aspect, Energy Star® ratings set standards on power supply load loss and operational efficiency for computer systems. For example, Energy Star® 6.1 standard was effective as of 2014. Energy Star® specifications provide for energy efficiency of server systems and other information handling systems as well. In a particular aspect, Energy Star® compliance also provides for operational limitations on power supply units used with information handling systems. In part, Energy Star® efficiency standards require a limit on power dissipation of 10% of load conditions. However, varying loads make for variations on the efficiency of a power supply unit. In particular, during high performance under heavy load or normal load conditions, the efficiency levels that provide for high performance and meet the efficiency power dissipation standards may not equally apply under light load conditions.

Processor manufacturers such as Intel® further provide performance requirements of power supply units to information handling systems. In an example aspect, processors such as central processing units and the like require expedient responses under very light load conditions for fast responses of a processor from dormant operation conditions. For example, a real-time or near real-time response may be required, but under light load conditions, for an Intel Ready Mode Technology or "Never Sleep" response state of Intel® processors. Thus, performance must be maintained for the power supply unit even under light load conditions.

Accommodation of normal or high loads and light loads may occur within adjustments made to power factor correction (PFC) circuitry and modifications to bulk capacitance voltages to maintain a limited, non-sine wave distortion on the high voltage side of a power supply unit that supplies of power to the transformer and, consequently the output to a load. However, many power supply units further support a wide range of input alternating current (AC) voltage levels for rectification and supply to a transformer. This wide range of power supply voltages may however interfere with efforts to accommodate adjustments between normal or high loads and light load conditions via adjustments to PFC circuitry. At the higher end of the input AC voltage range for a power supply unit for example, a switch to a light load condition in the PFC circuitry may result in distortion which may be experienced as an undesirable ripple in the output voltage. A light load efficiency control circuit may determine when a high input AC voltage range is being used and provide additional control the PFC circuitry to eliminate the risk of PFC distortion and reduce output ripple according to embodiments described herein.

Examples are set forth below with respect to particular aspects of an information handling system for adaptively enhancing transient response for a plurality of output voltages.

Figure 1:
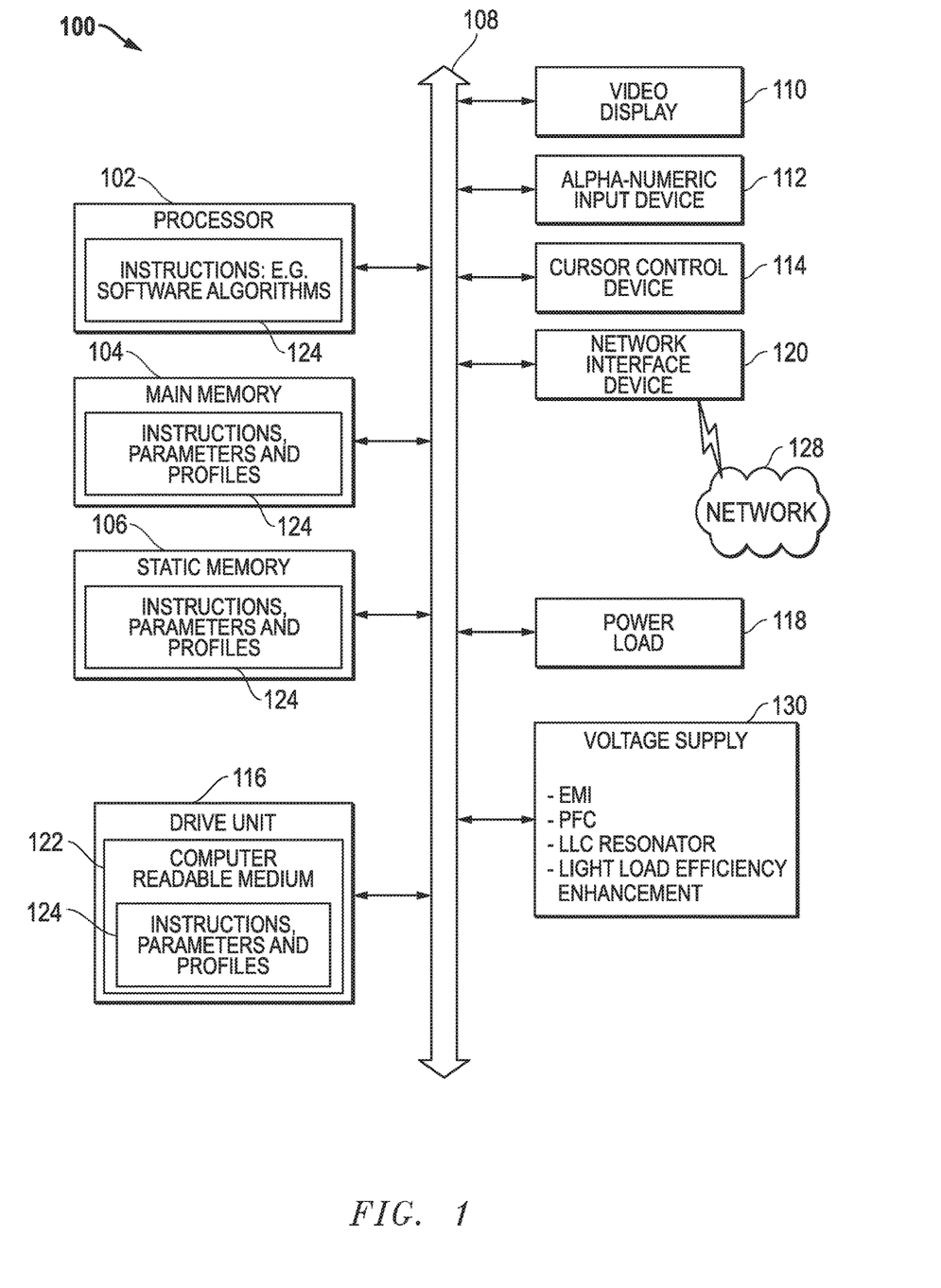
FIG. 1 is a block diagram illustrating a generalized embodiment of an information handling system according to an embodiment of the present disclosure.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions. Specifically, the information handling system 100 may include a power adapter module 130 operatively connected to a computing device, also referred to as a power supply unit 130, or may be operatively connected to a power supply unit 130, as described in greater detail below. In some example embodiments, power supply unit 130 may be a switchable power supply unit able to provide a variety of request output DC voltage levels.

Information handling system 100 can include devices or modules that embody one or more of the devices or processing logic to execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein.

In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices. Bus 108 may include a power supply bus or a connection to one or more power rails in some embodiments. Portions of an information handling system may themselves be considered information handling systems.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and a cursor control device 114, such as a mouse, touchpad, or gesture or touch screen input.

The information handling system 100, as shown in FIG. 1, may also include a power load 118, and a power source 130. The power load 118 may be any electrical component or portion of a circuit that consumes electric power in the information handling system and operates as a load on the power source module 130, including but not limited to several of the components of an information handling system as described herein and understood by a person of skill in the art. The power source 130 may be any electrical component that generates power from alternating current (A/C) or provides power to an information handling system such as via a battery power system. For example, power source 130 may be a power adapter module or power supply unit external to the information handling system or integrated within the information handling system, or some combination of both. In the present disclosure, an external or internal power supply unit 130 may include power controllers including voltage control circuitry. In some examples, the power supply system 130 may be connected to bus 108 such as a power supply controller system. Power load 118 may also be connected to bus 108. It is understood that power may be provided to the information handling system power rails as described to supply power to processor systems 102, memory 104 and 106, video display systems 110, and other power loads 118.

Power supply module 130 may include voltage regulation circuitry including an electromagnetic interference protection stage, a power factor correction stage, bridge rectification, LLC resonator stage, a transformer, control logic, and a rectifier stage on a secondary side of the power supply module 130 as understood by those of skill. According to embodiments herein, power supply module 130 may include a light load efficiency enhancement capability which may include a light load efficiency control system working in connection with a multi-stage bulk capacitor voltage level system of control for the power factor correction and LLC resonator stages. Further discussion of these aspects of the power supply module 130 are discussed below.

Network interface device 120 represents a NIC disposed within information handling system 100, on a main circuit board of the information handling system, integrated onto another component such as processor 102, in another suitable location, or a combination thereof. The network interface device 120 can include another information handling system, a data storage system, another network, a grid management system, another suitable resource, or a combination thereof. Network interface device 120 in an embodiment may operably connect to a network 128. Connection to network 128 may be wired or wireless.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of code instructions 124 that can be executed to cause the computer system to perform any one or more of the methods or computer based functions disclosed herein. For example, information handling system 100 includes one or more application programs 124, and Basic Input/Output System and Firmware (BIOS/FW) code instructions 124. BIOS/FW code instructions 124 function to initialize information handling system 100 on power up, to launch an operating system, and to manage input and output interactions between the operating system and the other elements of information handling system 100. In a particular embodiment, BIOS/FW code instructions 124 reside in main memory 104, and include machine-executable code that is executed by processor 102 to perform various functions of information handling system 100. Main memory 104 may include, but may not be limited to non-volatile random access memory. In another embodiment, application programs and BIOS/FW code reside in another storage medium of information handling system 100. For example, application programs and BIOS/FW code can reside in static memory 106, drive unit 116, in a ROM (not illustrated) associated with information handling system 100 or other memory. Other options include application programs and BIOS/FW code sourced from remote locations, for example via a hypervisor or other system, that may be associated with various devices of information handling system 100 partially in main memory 104, static memory 106, drive unit 116 or in a storage system (not illustrated) associated with network interface device 120 or any combination thereof. Application programs 124, and BIOS/FW code instructions 124 can each be implemented as single programs, or as separate programs carrying out the various features as described herein. In an embodiment, the application programs may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Application program interfaces (APIs) such as Win 32 API may enable application programs 124 to interact or integrate operations with one another.

In an example of the present disclosure, the processor 102 may execute code instructions 124 of a plurality of application programs, and an API may enable interaction between the application programs and device drivers and other aspects of the information handling system thereon. The information handling system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The drive unit 116 may include a computer-readable medium 122 such as a magnetic disk in an example embodiment. The computer-readable medium of the main memory 104, static memory 106, and drive unit 116, may store one or more sets of code instructions 124, such as software code corresponding to the present disclosure. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. For example, the light load efficiency control system of the embodiments herein may operate on controller logic in part in firmware at a power supply module 130. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as a Intel® Core class processor, ARM® brand processors, Qualcomm® Snapdragon processors, or other processors and chipset, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2A:
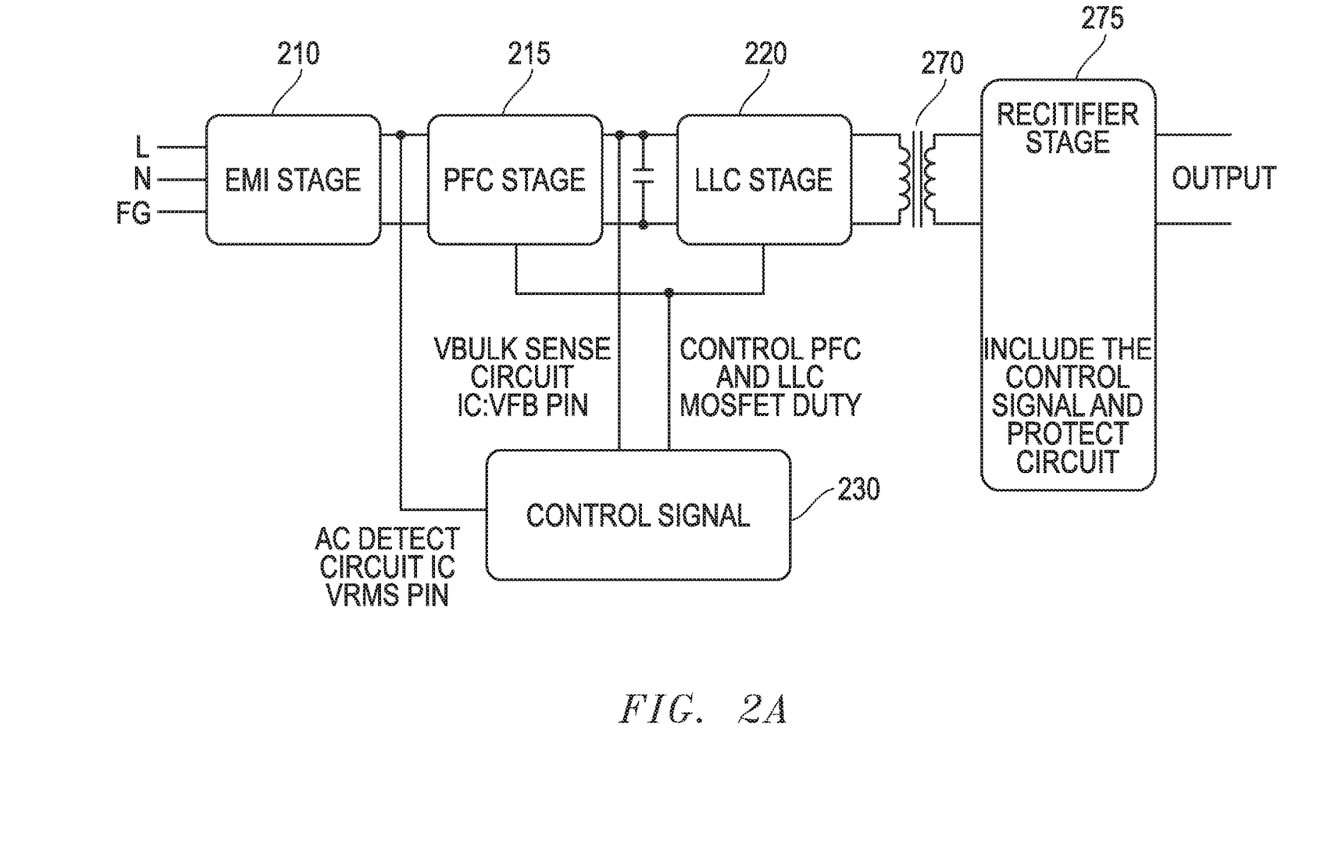
FIG. 2A is a block diagram of a power supply unit with a voltage regulation circuit according to an embodiment of the present disclosure.

FIG. 2 shows a block diagram of components of a power supply unit. Several stages of a power supply are shown. Example stages include an electromagnetic interference EMI stage 210, a PFC circuit stage 215, an LLC resonant converter stage 220, a transformer 270 and a rectifier stage 275 that may include control signal feedback for error amplification as well as protection circuitry. The EMI stage 210 is an initial stage that may protect a power supply unit from power grid noise and voltage spikes and may shield noise including common mode noise and differential mode noise. It is understood that an EMI stage 210 may include choke coils, capacitors, varistors for surge suppression and fuses in some aspects. An EMI circuit which may be used to reduce both types of noise. Further EMI stage 210 may reduce noise of any bridge rectification (not shown) on the high voltage side of the transformer as well.

A power factor correcting (PFC) circuit stage 215 may receive an AC voltage that is input into a bridge rectifier and rectified at the PFC stage 215. Further the PFC stage 215 may include an active power factor correction converter of the PFC stage that may include pulse width modulation (PWM) to trigger field effect transistors (FETs) or other features understood to pulse sequence DC voltages resultant from the bridge rectifier of an AC input voltage. Additionally, after the PFC stage 215 the power supply may also include inductors or other components of an LLC resonator stage 220 understood to limit current inrush as well as bulk capacitors to smooth the DC voltage pulses to a more constant DC voltage signal. In addition, the FET switchers provide an AC rectangular waveform for supply to a transformer 270 for stepping down to an output voltage at the secondary side of the power supply unit. The transformer 270 also acts as an isolator between the primary and secondary side of the power supply unit. The LLC resonator 220, as previously mentioned, is used to reduce ripple, voltage and current on the DC levels supplied by the power supply. Further, the LLC resonator 220, a combination of inductors and capacitors, shapes the voltage and current waveforms and reduces the switching loss in the MOSFETs and provides for an efficiency boost. A plurality of LLC resonator types 220 may be utilized as understood in the art to achieve as close to zero-voltage switching and minimize energy loss in the PFC stage 215.

The PFC stage 215 is used to manage the effects of combined resistive and reactive loads relating to mixed resistance, capacitance and inductance of the loads. In an aspect, a PFC circuit stage 215 manages a ratio (power factor) between apparent power and real power consumed by a load. The greater the real power ratio (e.g. closer to +1), the higher the efficiency of the power supplied and the reduction in the amount of reactive energy flow in the power circuit. For a power supply unit, a power factor may be required to be above a certain level for certification under a power efficiency standard. For example, Energy Star standards may have an "80 Plus" certification that requires a power factor of greater than 0.9.

The FET switching of the PFC stage 215 may be controlled by controller 230 which may operate as a pulse width modulation (PWM) controller 230 to maintain a regulated output voltage via error amplifier feedback and control an amount of energy delivered. The duty cycle may be adjusted depending on the level of error voltage received relative to a reference. The voltage feedback is isolated between the primary and secondary sides of the power supply via opto-couplers (not shown). The PWM controller 230 may alter a duty cycle of the FET switchers and is maintained via the control line labeled "control PFC and LLC MOSFET duty."

The controller 130 may also detect the bulk capacitor voltage "$V_{BULK}$" as well as detecting AC RMS voltage ($V_{RMS}$) after the EMI stage 215. In some example embodiments, a controller 230 may also be a PFC controller for the PFC stage 215 and the LLC resonator stage 220 or may be a separate controller from the PWM controller. An example is a Champion Microelectronic integrated circuit CM6502 power factor correction (PFC) control circuit which may provide for flexibility to adjust bulk capacitor voltage levels as described herein. Other controller variations are contemplated as well. One or more processor types or controllers, such as a DSP or MCU, may be used to execute code instructions relative to the controller stage 230 to implement the light load efficiency system of the present embodiments. Further, the light load efficiency control system described in the present disclosure may be implemented in processor logic co-located with a PFC controller or a combination controller 230.

As shown in FIG. 2, a power load 118 or other load of an information handling system as shown in FIG. 1 in an embodiment may be operably connected to an output of the rectifier stage 275 of the power adapter or power supply unit of FIG. 2. In some example embodiments, the power supply unit or power adapter may be housed within a computing device, such as a tablet, laptop, desktop, or other mobile computing device, or may be housed in a power adapter that may be connected or disconnected from the computing device.

The power supply unit efficiency loss may occur due to several stages of the power supply unit as shown in FIG. 2. This may include the EMI stage 210, the PFC stage 215, the LLC stage 220, and operation of other components as described. Some efficiency is lost in the PFC stage 215 due to inefficient MOSFET switching and other factors. Reduction in the bulk capacitor voltage within the PFC stage 215 may increase efficiency and, under light load conditions, not substantially compromise performance of the PFC stage circuit 215.

Accommodation of normal or high loads and light loads may occur within adjustments made to PFC circuitry 215 and modifications to bulk capacitance voltages to maintain limited, non-sine wave distortion to the supply of power to the transformer and output to a load on the high voltage side of a power supply unit. As described previously, many power supply units further support a wide range of input AC voltage levels for rectification and supply to a transformer 270 for providing an output voltage to a load such as an information handling system. A power supply unit may adjust its operation as between normal or high loads and light load conditions since these conditions may not have the same characteristics for energy loss in the primary side of the power supply unit. As mentioned above, the wide range of power supply voltages may interfere with efforts to accommodate adjustments between normal or high loads and light load conditions to maintain power efficiency levels via adjustments to PFC circuitry 215. At the higher end of the input AC voltage range for a power supply unit for example, a switch to a light load condition in the PFC circuitry 215 may result in distortion which may be experienced as an undesirable ripple in a DC output voltage.

Embodiments of the present disclosure provide for maintaining power dissipation efficiency standards under light load, but without substantial alteration to the high performance operation and efficiency aspects of the power supply unit under normal or heavy load conditions. For example, a Champion Microelectronic integrated circuit CM6502 power factor correction (PFC) control circuit which may be part of controller 230 may provide for two stage bulk capacitor voltage levels to accommodate load adjustment between high and low load levels. In an example embodiment, the PFC circuit 215 under control 230 with two stage bulk capacitor voltage may have a gap between the high step bulk capacitor voltage and a low step bulk capacitor voltage level. The high step bulk capacitor voltage may be enabled for a greater load levels such as greater than a threshold percentage load level. The threshold load level may be a 70% load in some embodiments above which a higher step bulk capacitor voltage is used. As described in other embodiments, any load percentage level may be used as a threshold, for example anything between 70% and 90%. The PFC circuit may have a low step when the bulk capacitor voltage when the load is below a threshold load in another aspect. The low step may be reduced by a 25 $V_{DC}$ gap between the high step bulk capacitor voltage (380 $V_{DC}$) and the low step bulk capacitor voltage level (365 $V_{DC}$) in a further example embodiment.

In some aspects however, when a transition of the bulk capacitor voltage to a low step drops below an input voltage peak power level for input alternating current voltage, a bulk capacitor voltage distortion occurs from the two stage PFC circuit 215. This distortion impacts the output voltage of the power supply unit with an undesirable ripple. In a particular example embodiment, a power supply unit may accommodate a wide range of input AC voltages including a range between 90 $V_{AC}$ and 264 $V_{AC}$. For the high end of the range, such as 264 $V_{AC}$, an input peak voltage value is 373 V. It is determined that when a peak value for the AC input voltage exceeds the bulk capacitor voltage value, the distortion occurs in the power signal. In a particular example, the low step bulk capacitor voltage adjustment for light loads is 365 $V_{DC}$ which is below the input peak voltage level associated with a 264 $V_{AC}$ input voltage. In this example, the result is that the bulk capacitor voltage is reduced below the input peak voltage value which results in a bulk capacitor voltage distortion and an undesirable output ripple. Other high range input voltages may yield a higher input peak voltage above the low step bulk capacitor voltage ($V_{BULK}$).

Figure 2B:
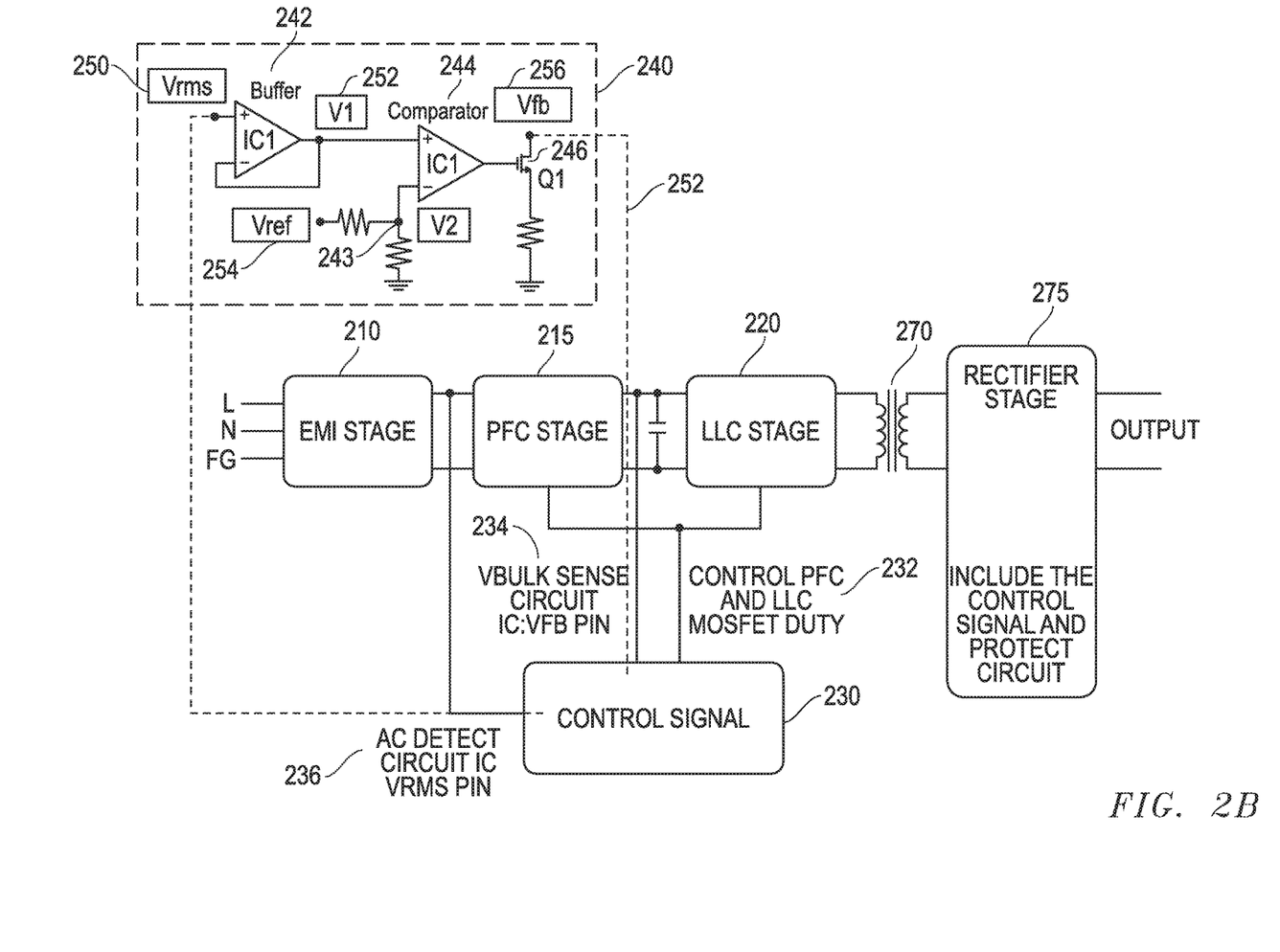
FIG. 2B is a block diagram of a power supply unit with a voltage regulation circuit and light load efficiency control according to an embodiment of the present disclosure.

FIG. 2B shows a shows a block diagram of components of a power supply unit with a light load efficiency control circuit and system. The light load efficiency control 240 may be used to boost bulk capacitance voltage adjustment to compensate for the two stage bulk capacitance voltage levels available through the PFC controller 230 such as with a CM6502 controller when input AC voltages are at a high range. The power supply unit contains an EMI stage 210, a PFC stage 215, an LLC resonator stage 220, a transformer 270 and a rectifier stage 275 with error feedback control and protection circuitry. The power supply unit may operate similarly to the operation of the power supply unit described in FIG. 2A above. The PFC controller 230 may provide PWM control of the PFC stage 215 and LLC resonator stage 220 for adjustment to a MOSFET duty cycle as described 232. Additional function of the stages 210, 215, 220, 270, and 275 as well as control 230 for the two stage $V_{BULK}$ levels for high performance or normal versus light load conditions may also operate similarly to the description of operation of the power supply unit in FIG. 2A above. Further the PFC controller 230 may also monitor and control the bulk capacitor voltage $V_{BULK}$ via a sense circuit connection 234.

The light load efficiency control circuit 240 may be connected to the PFC control circuitry 230 as shown. The AC detection of $V_{RMS}$ 236 may be provided at 250 to a buffer circuit 242 of the light load efficiency control circuit 240. The buffer circuit 242 detects the AC voltage $V_{RMS}$ but avoids the input into the light load efficiency control circuit 240 having a loading effect or the light load efficiency control circuit 240 being subject to interference. Buffer circuit 242 may be a low voltage amplifier, such as an LM358, used in a buffering configuration in an example embodiment. The buffered AC voltage level $V_1$ 252 is supplied to a comparator 244 for comparison to a second voltage $V_2$ 243 that is a voltage division of a reference voltage $V_{REF}$ 254. Comparator integrated circuit 244 may also be a low voltage amplifier, such as an LM358, that used in a comparison configuration in an example embodiment.

The compared voltage $V_2$ is set such at a value such that the comparison at comparator 244 determines whether the AC voltage received at the light load efficiency control circuit 240 is above a threshold level. In one example embodiment, that threshold level of $V_{AC}$ into the power supply unit may be set at 240 $V_{AC}$. Other levels are contemplated as well and will be in the higher AC voltage range available and supported by the power supply unit. Typically the threshold will be at the higher $V_{AC}$ values supported and will be keyed to indicate whether the $V_{AC}$ would translate into a peak voltage above the low step $V_{BULK}$ level of the PFC circuit 215 reserved for light load conditions. In other words, the compared voltage $V_2$ would represent a voltage approximately similar to the tolerable level of $V_{AC}$ (peak voltage level) that would not exceed or approach the low step bulk capacitor voltage for the PFC circuit 215 to avoid the bulk capacitor voltage distortion to the output voltage as described.

If the compared $V_1$ voltage (the buffered $V_{RMS}$ voltage) exceeds the reference comparison voltage $V_2$ at comparator 244, then the output of comparator 244 is a high level. The output of comparator 244 is operatively connected to the gate of transistor $Q_1$ 246. For example, $Q_1$ 246 may be a MOSFET such as an N-channel MOSFET 2N7002 in an example embodiment. When the voltage from the comparator 244 is high, transistor $Q_1$ 246 is activated. Upon activation of the transistor $Q_1$ 246, the default feedback voltage level $V_{FB}$ 256 is altered and this signals, via connection 252, the PFC controller 230. This $V_{FB}$ level 256 change will thereby cause the light load efficiency control system to operating to adjust the $V_{BULK}$ levels of the bulk capacitor for the PFC circuit 215. The $V_{BULK}$ levels for the PFC circuit 215 may be changed by the controller 230 between the two low step and high step bulk capacitor voltage stages. For example, the PFC controller may raise the $V_{BULK}$ levels to the high step to avoid the ripple and interference that may occur with the low step $V_{BULK}$ level. Execution of this change in bulk capacitor voltage level may be conducted by firmware or software code instructions operating according to the discussion herein and causing the PFC controller to raise the $V_{BULK}$ levels to avoid interference at high input $V_{AC}$ levels. Accordingly, embodiments of the present disclosure, including light load efficiency control circuit 240 and a light load efficiency system of instructions executing on logic such as controller 230 or other logic, provide for boosting the PFC circuit 215 bulk capacitance voltage to avoid the bulk capacitor distortion and ripple effect on the output voltage.

Figure 3:
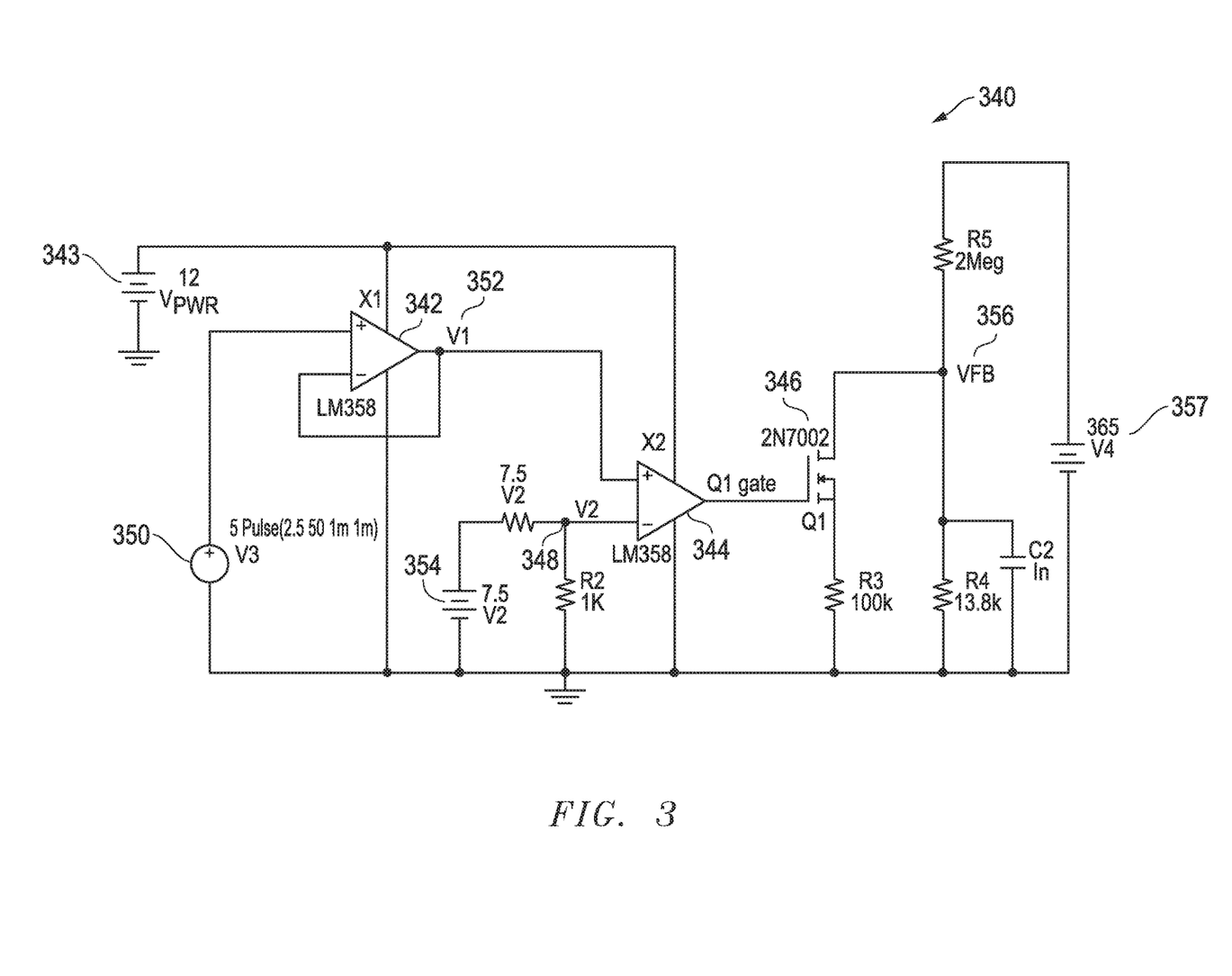
FIG. 3 is a circuit diagram of a light load efficiency control circuit according to an embodiment of the present disclosure.
Figure 4:
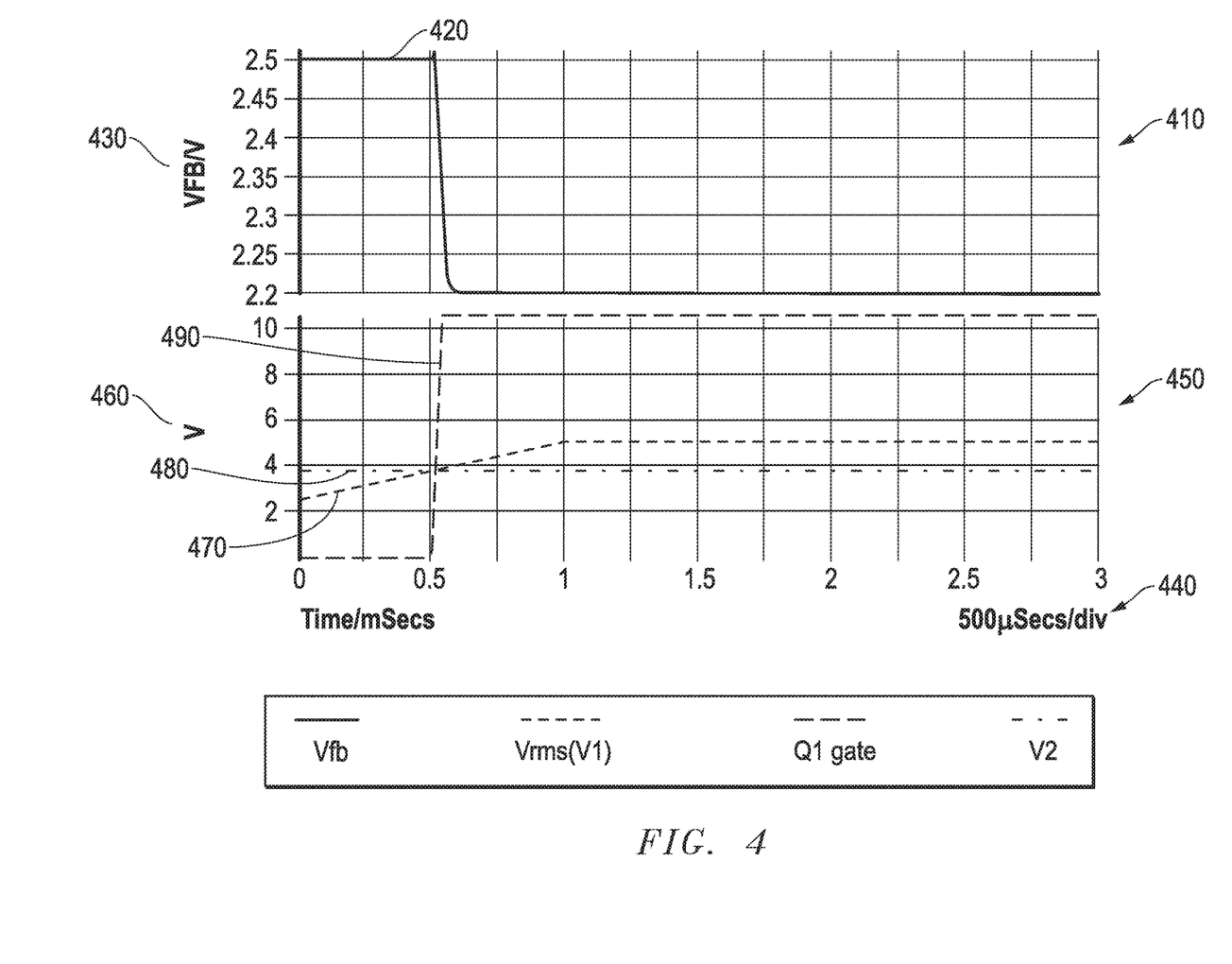
FIG. 4 is a graphical diagram illustrating a response to a light load efficiency control circuit according to an embodiment of the present disclosure.

FIG. 3 shows an embodiment of a light load efficiency control circuit according to another example embodiment. The light load efficiency control circuit 340 shows detail of an operational embodiment with input from the power regulation circuitry of the power supply unit from $V_3$ and output to the power regulation circuitry at $V_{FB}$. As the input voltage is increased at $V_3$, the $V_{FB}$ response may be shown in FIG. 4. FIG. 4 shows a graphical chart illustrating a response of the light load efficiency control circuit 340 depicted in FIG. 3.

In an example embodiment, $V_3$ may be a voltage applied to buffer integrated circuit at operational amplifier 342. In an example embodiment, an LM358 low power amplifier may be used at 342. The amplifier 342 is powered by power source $V_{pwr}$ 343 and is set up in a buffering configuration as described. The output of the buffer amplifier 342 at $V_1$ 352 is fed into comparator 344. This is the buffered $V_1$ represents the input AC voltage level received by the power supply unit as described.

Comparator 344 may also be a low power integrated circuit such as an operational amplifier in various embodiments. In an example embodiment, an LM 358 amplifier may be used. Comparator 344 is also powered by $V_{pwr}$ 343. $V_2$ 348 is provided for comparison and supplied by power supply 354 and a resistor network such as shown to the input of comparator 344 as shown. $V_2$ is set at a threshold reference voltage level that relates to the tolerable level of AC input voltage before any distortion occurs.

If the comparison of $V_1$ and $V_2$ shows that $V_1$ exceeds the reference voltage level $V_2$, this drives the output of comparator 344 high. Output of comparator 344 is fed to gate of transistor $Q_1$ 346. As described, $Q_1$ 346 may be a MOSFET transistor such as a 2n7002 transistor. When the gate of $Q_1$ receives a high signal, transistor $Q_1$ is activated.

Upon activation of the transistor $Q_1$ 346, the default feedback voltage level $V_{FB}$ 356 generated by voltage source $V_4$ at 357 is altered opening the circuit to resistor R3. The default feedback voltage $V_{FB}$ 356 is established by $V_4$ 357 with resistors $R_4$ and $R_5$ as well as capacitor $C_2$. Thus, $V_{FB}$ 356 may have a default voltage level when transistor $Q_1$ 346 is closed or not activated. An adjusted second voltage occurs at $V_{FB}$ 356 when transistor $Q_1$ 346 is activated. Activation of $Q_1$ 346 opens the circuit to resistor $R_3$ which reduces or otherwise alters $V_{FB}$ 356. When the bulk capacitance voltage signal feedback level $V_{FB}$ 356 of is altered, the alteration is detected by the PFC controller. For example, in FIG. 2B line 252 may allow controller 230 to detect the change in $V_{FB}$.

The alteration of the $V_{FB}$ level 356 may thereby cause the light load efficiency control system operating on a controller or other logic in the power supply unit to adjust the $V_{BULK}$ levels of the bulk capacitor for the PFC circuit. For example, the $V_{BULK}$ for a PFC circuit such as 215 in FIG. 2B may be changed by the controller 230. Execution of this change in bulk capacitor voltage level may be conducted by firmware or software code instructions operating according to the discussion herein causing the PFC controller to raise the $V_{BULK}$ levels to avoid $V_{BULK}$ interference at high input $V_{AC}$ levels described herein.

Turning to FIG. 4, a graphical representation of the response of the light load efficiency control circuit 340 is shown according to an embodiment. Graph 410 shows the response of $V_{FB}$ 420 in connection with activation of transistor $Q_1$ 346 upon detection of an increased $V_1$ representing an increase of $V_{RMS}$ for input AC voltage under light load conditions. The x-axis 430 of graph 410 shows the range of $V_{FB}$ values 420 when a transition of $V_{FB}$ occurs. Y-axis 440, which is shared with graph 450, shows the time response of the light load efficiency control circuit. The legend shows the solid line as $V_{FB}$ 420.

Graph 450 shows the voltage response of the compared voltages within the voltage range shown on the x-axis 455. The voltage responses shown in graph 450 include the $V_1$ 420 or the buffered $V_{RMS}$ representing the input AC voltage level shown by the first dashed line. Graph 450 shows the reference voltage level $V_2$ 480 provided to the comparator for comparison to $V_1$ 470. Reference voltage $V_2$ 480 is shown as a dashed and dotted line as depicted in the legend. Reference voltage $V_2$ 480 represents a $V_{RMS}$ value that relates to a voltage level of input AC voltage that is tolerable relative to a low step of a two stage bulk capacitor voltage system used to accommodate light load conditions by the PFC circuit.

Graph 450 also shows the output response of the comparator that is fed to the transistor gate $Q_1$ represented by voltage trace 490 which is another dashed line in graph 450. The legend shows the corresponding dashed line for the gate voltage of $Q_1$ 490.

As shown, $V_1$ 470 which relates to the detected input AC voltage rises over time. Upon the voltage $V_1$ 470 rising above the constant voltage level of the reference voltage $V_2$ 480, at the crossover point comparator output to $Q_1$ gate 490 goes high. In the present example, $Q_1$ gate 490 rises from 0V to above 10V. Similarly, the $V_{FB}$ response 420 very shortly afterward begins to respond to the activation of transistor $Q_1$. The voltage $V_{FB}$ 420 drops from 2.5 V to 2.2 V in the present example embodiment. This change may be detected by the PFC controller circuit to implement remedial measures on the dual stage bulk capacitor voltage levels to avoid bulk capacitor voltage interference when the input AC voltage levels received are in the high range.

Figure 5:
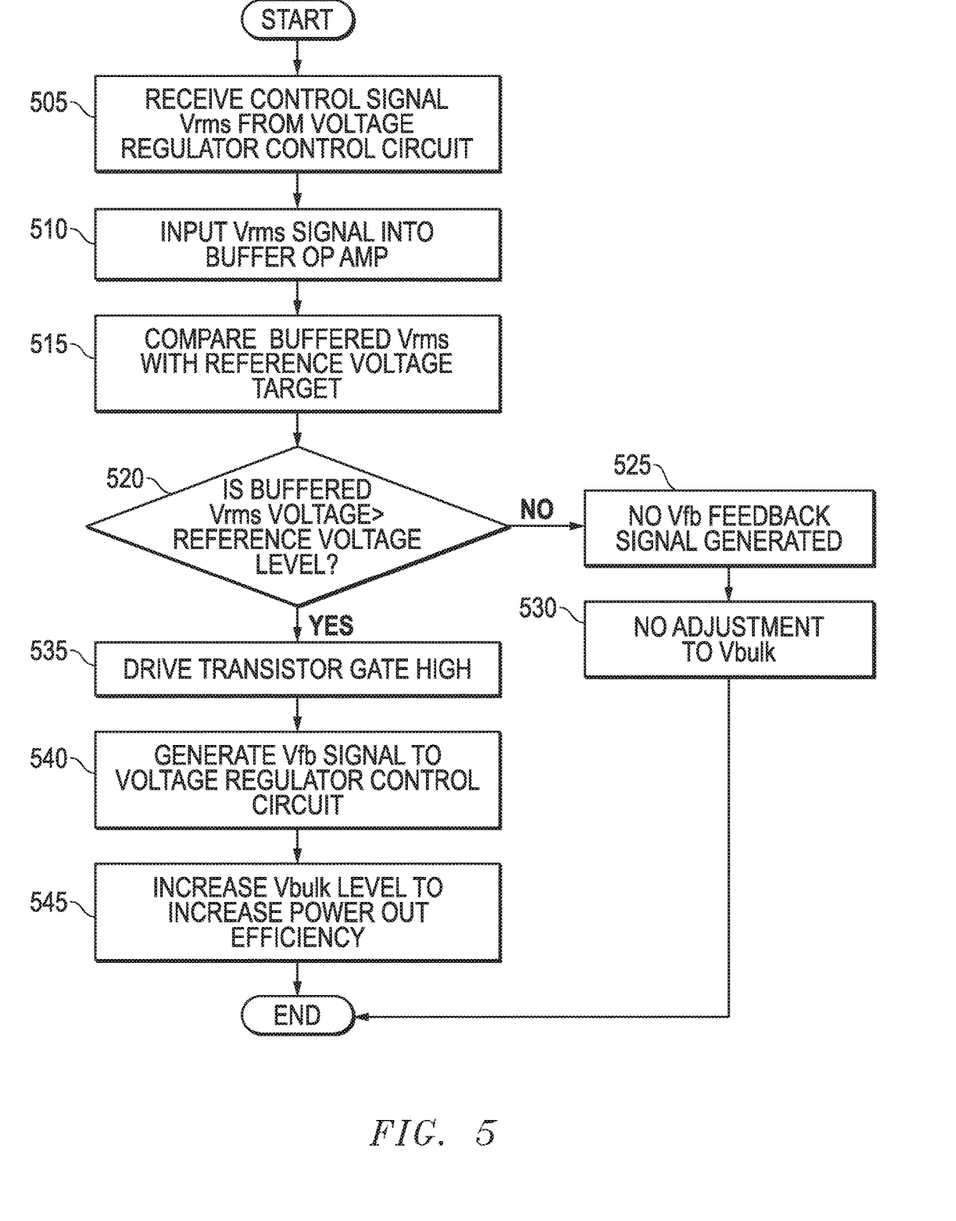
FIG. 5 is a flow diagram illustrating a method of operating a light load efficiency control circuit to control bulk capacitance voltage according to an embodiment of the present disclosure.

FIG. 5 is a flow chart showing a method of operation of a light load efficiency control circuit according to embodiments of the present disclosure. Flow begins at 505 where the light load efficiency control circuit receives a $V_{RMS}$ voltage signal level from the power supply unit or the associated voltage regulator controller. The $V_{RMS}$ represents a peak voltage level relative to the currently received AC voltage at the power supply unit. In an aspect, this voltage may be after bridge rectification according to some embodiments. Proceeding to 510, the $V_{RMS}$ signal voltage is received by a buffering operational amplifier to protect the light load efficiency control circuit from transients or peaks from the AC grid as well as to reduce circuit noise. At 515, the buffered $V_{RMS}$ signal is compared with a target reference voltage at a comparator circuit. In an example embodiment, an operational amplifier may be set up in a circuit to receive $V_{RMS}$ and compare it to a $V_{REF}$ target voltage level provided by a power supply and resistor network. The $V_{REF}$ target value is set to represent a level relative to the received $V_{RMS}$ above which the $V_{RMS}$ represents a peak voltage level of the input AC voltage that would exceed the low step bulk capacitor voltage level of the PFC circuitry.

At 520, the light load efficiency control circuit detects whether the $V_{RMS}$ is greater than the $V_{REF}$ level by the comparator circuit. If $V_{RMS}$ is not greater than the $V_{REF}$ level, flow proceeds to 525 where no feedback signal $V_{FB}$ is generated to the PFC controller circuit to indicate a change is needed in the low-step bulk capacitor voltage level. The $V_{FB}$ may be an affirmative signal $V_{FB}$ where no voltage previously existed in some embodiments. In other embodiments as described herein, a change in the $V_{FB}$ level provided by the light load efficiency control circuit may indicate the necessary change to the low step bulk capacitor voltage. At 525, no feedback signal $V_{FB}$ is generated by the light load efficiency control circuit or no change is detected in the $V_{FB}$ voltage level from the light load efficiency control circuit. Proceeding to 530, no adjustment is made to the bulk capacitor voltage level $V_{BULK}$ of the PFC circuit in the power supply unit by the PFC controller. Upon receiving no change in the feedback signal $V_{FB}$, the PFC controller determines that the input AC peak voltage levels do not interfere with the low step bulk capacitor voltage level $V_{BULK}$ at 530 during implementation of that low step $V_{BULK}$ level to accommodate light load conditions. Accordingly, the PFC controller makes no change to the low step $V_{BULK}$ level at the PFC circuit and light load adjustment is maintained.

If it is $V_{RMS}$ is greater than the $V_{REF}$ level at 520, flow proceeds to 535 where a comparator drives the transistor gate voltage high. Driving the transistor gate voltage high will yield a feedback signal $V_{FB}$ at 540 to be generated and delivered to the PFC controller circuit to indicate a change is needed in the low-step bulk capacitor voltage level. As described, in some embodiments the $V_{FB}$ may be an affirmative signal $V_{FB}$ where no voltage previously existed. In other embodiments as described herein, a change in the $V_{FB}$ level is provided by the light load efficiency control circuit to indicate to the PFC controller in the voltage regulation control circuit that a change is necessary to the low step bulk capacitor voltage.

At 545, upon receipt of a $V_{FB}$ signal or a change in $V_{FB}$ voltage level signaling a high input AC voltage at 540, an adjustment is made to the bulk capacitor voltage level $V_{BULK}$ of the PFC circuit in the power supply unit by the PFC controller. Upon receiving the feedback signal $V_{FB}$, the PFC controller determines that the input AC peak voltage levels have risen and may interfere with the low step bulk capacitor voltage level $V_{BULK}$. In an example embodiment, for a PFC system with a two stage bulk capacitor voltage level having one setting for light load and another setting for normal load conditions, determination that the input AC voltage has risen such that $V_{FB}$ may indicate to the PFC controller that a high step $V_{BULK}$ level is required to avoid ripple. The PFC circuit may then shift to the high-step level of $V_{BULK}$ pursuant to the PFC controller and execution of instructions to do so. The light load adjustment is reversed. In an example embodiment, the $V_{BULK}$ may be raised from 365V (low step) to 380V (high step) such that the $V_{BULK}$ is now above the peak voltage of the input AC voltage and distortion is avoided.

Figure 6:
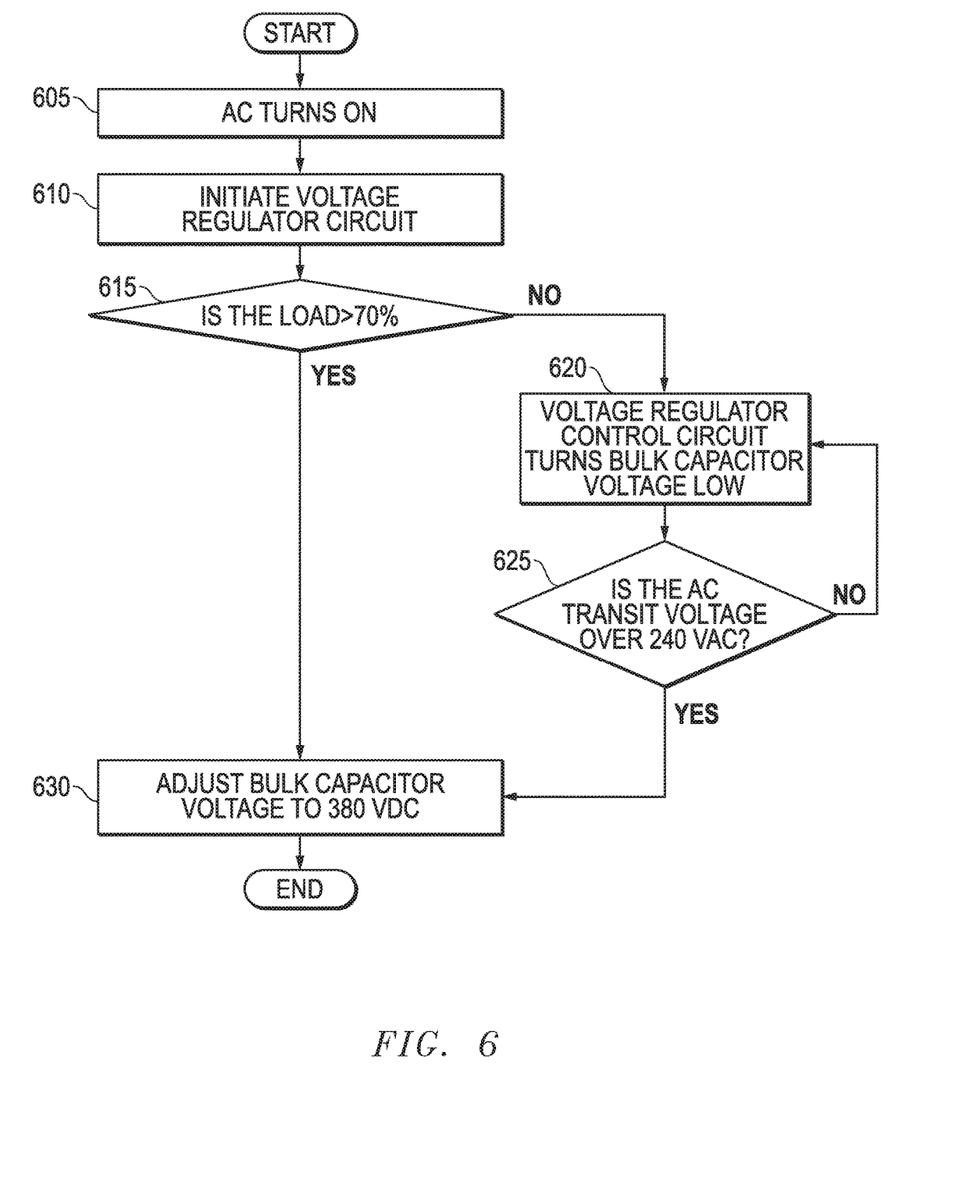
FIG. 6 is a flow diagram illustrating a method of adjusting bulk capacitance voltage control to enhancing light load efficiency according to an embodiment of the present disclosure.

FIG. 6 is a flow diagram illustrating a method of bulk capacitor voltage control between light load and normal load conditions in connection with a light load efficiency control circuit and system according to embodiments of the present disclosure. During operation of a power supply unit in an embodiment, the light load efficiency control circuit of the present disclosure operates to indicate whether AC voltage into the power supply unit exceeds a level of voltage relative to a low step bulk capacitance voltage for the voltage regulation circuit of the power supply unit. Further, a set of instructions for a light load efficiency control system may be executed to toggle between two stages of a plural stage bulk capacitor voltage level PFC system depending on load conditions. Depending on the level of input AC voltage to the power supply unit, an adjustment to the voltage levels of the plural stage bulk capacitor voltage PFC system may be made. Under light load conditions and when a light load efficiency control circuit and system provides feedback that the input AC voltage exceeds a level such that distortion due to the bulk capacitor voltage and output ringing may be experienced, the bulk capacitor voltage is increased.

Flow begins at 605 where alternating current is turned on or applied to a power supply unit. Proceeding to 610, the power supply unit begins to initiate a voltage regulator circuit including in some embodiments and EMI stage, a PFC stage, a LLC resonator stage, a rectification stage which may provide error amplification feedback and the like. In many of these stages, inductors and capacitors may take a period of time to charge up and begin to operate to regulate the power supply unit transformation of power to an output power voltage level or levels. In some embodiments, a PFC stage and or LLC resonator stage may include a bulk capacitor voltage level, and according to embodiments herein, a multi-stage bulk capacitor voltage level system may be available. For example, the PFC stage may be controlled at two stages by a PFC controller between a low-step bulk capacitor voltage level and a high-step bulk capacitor voltage level in some embodiments.

In accordance with descriptions above, the multi-stage bulk capacitor voltage levels may be tailored to determined load levels and adjusted accordingly to reduce power loss in the PFC stage of the power supply unit. In the presently described embodiment, a two stage bulk capacitor voltage level system may be implemented by the PFC circuit. A controller may establish a high-step voltage level for the bulk capacitor voltage level during normal load or high load conditions on the power supply system. A high-step level for $V_{BULK}$ in an example embodiment may be 380 $V_{DC}$. To increase efficiency during light load conditions, the controller may implement the low-step voltage level to reduce loss in the PFC stage. A low-step level for $V_{BULK}$ in an example embodiment may be 365 $V_{DC}$.

At 615, the PFC controller may determine what level or percentage load is being experienced by the power supply unit. The PFC controller may detect the current sense voltage to judge load levels. The PFC controller or another processor or logic of the power supply unit will execute code to determine whether a load level has reached or exceeded a threshold percentage level. In the example embodiment, the threshold level is a load level at 70%. In other embodiments a threshold load level may be any percentage between 70% and 100%. It is understood that any load level percentage may be deemed a heavy load level versus a light load level under variations on the present embodiments.

If at 615, the load level is at or below a threshold such as the example threshold of 70%, flow proceeds to 620. At 620, the light load enhancement system operating in the PFC controller of the voltage regulator control circuit will determine that the bulk capacitance voltage level may be shifted to the low step level to improve efficiency and reduce power loss of the PFC stage. In an example embodiment, the low step bulk capacitor voltage may be set at $365 V_{DC}$. It is understood that the low step, and high step, bulk voltage levels may be set at any level relative to one another depending on the circuit operation for the power supply and the PFC stage.

At 625, the light load efficiency control circuit may determine whether the input AC voltage, or AC transit voltage has reached or exceeded a threshold voltage level. Several embodiments of detection of the input AC voltage levels are described above. Feedback is provided to a controller from a light load efficiency control circuit. In an example embodiment, the threshold AC transit voltage level is 240 $V_{AC}$ which may translate to a peak voltage level above the low-step bulk capacitor voltage of the multi-stage bulk capacitor voltage system for the PFC and LLC resonator circuits. It is understood that any AC voltage level threshold may be used in the detection by the light load efficiency control circuit to avoid the undesirable distortion from the bulk capacitor voltage levels under light load conditions.

If at 625, the transit AC voltage input into the power supply does not exceed the threshold level, then the flow returns to 620 and the bulk capacitor voltage level is maintained at the low-step level. In this example embodiment, the bulk capacitor voltage level is maintained at 365 $V_{DC}$ under the light load condition for load levels at or below a threshold load level, for example 70% or another percentage threshold load level.

If at 625, the transit AC voltage input into the power supply does exceed the threshold level, then flow proceeds to 630 and the bulk capacitor voltage level is raised to the high-step level. In this example embodiment, the bulk capacitor voltage level is raised to 380 $V_{DC}$ despite the light load condition for load levels at or below a threshold load level such as 70%. Raising the bulk capacitor voltage to the higher level via the feedback from the light load efficiency control circuit will result in the bulk capacitor voltage operating at a voltage level higher than the peak voltage of the input AC voltage. As a result, distortion in the output voltage due to the bulk capacitor voltage may be avoided.

If load at 615 is determined to be greater than the threshold load level, then flow proceeds to 630 where the multi-stage bulk capacitor voltage control levels is set at a high-step level to accommodate a need for greater performance. As described, the high-step bulk capacitor voltage level in an embodiment may be 380 $V_{DC}$. Any detection of an input AC voltage by the light load efficiency control circuit and feedback indicating the same will not affect the PFC controller or cause a change in the bulk capacitor voltage level since the level already operates at the high-step level. At this point, the flow may end. It is understood that the light load efficiency control circuit and bulk capacitor voltage control system may continue to monitor both load levels and input AC voltage levels to adjust the system according to above embodiments.

The blocks of the flow diagrams of FIGS. 5 and 6 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A power supply unit operating a light load efficiency control system comprising:
   a power regulator circuit for receiving an alternating current (AC) input voltage from within a range of accommodated AC input voltages including:
      a power factor correction (PFC) circuit and an LLC resonator circuit having a bulk capacitance voltage level and operable to receive the input AC voltage in the power supply unit;
      a transformer to step down the input AC voltage; and
      a rectifier circuit for generating a DC output voltage;
   a processor logic core for the power regulator circuit to control a plural stage bulk capacitor voltage level having at least a high step bulk capacitor voltage level for operation when a normal load is applied to the power supply unit and a low step bulk capacitor voltage level for operation under light load conditions;
   a light load control circuit for receiving a control input voltage representative of the AC input voltage received by the power regulator circuit, comparing via a comparator circuit the control input voltage to a reference voltage generated to represent a threshold level of AC input voltage, and activating a light load control feedback signal if the control input voltage exceeds the reference voltage level; and
   the processor logic core transitioning the plural stage bulk capacitor voltage level from a low step bulk capacitor voltage level to a high step bulk capacitor voltage level to avoid ringing in the DC output voltage upon receiving the light load control feedback signal from the light load control circuit.

2. The power supply unit operating a light load efficiency control system of claim 1, further comprising:
   a feedback error amplifier loop from the rectifier circuit to a pulse width modulator; and
   the processor logic core providing pulse-width modulation control of the MOSFET duty cycle to the PFC circuit and LLC resonator.

3. The power supply unit operating a light load efficiency control system of claim 1, further comprising:
   an electromagnetic interference stage of the power regulator circuit for receiving the alternating current (AC)

input voltage and shielding the power regulator circuit from transient AC voltage grid spikes.

4. The power supply unit operating a light load efficiency control system of claim 1, wherein the light load control feedback signal is a feedback voltage generated by the light load control circuit and received by the processor logic core.

5. The power supply unit operating a light load efficiency control system of claim 1, wherein the light load control feedback signal is a feedback voltage level changed by the light load control circuit and the changed feedback voltage level is detected by the processor logic core.

6. The power supply unit operating a light load efficiency control system of claim 1, wherein the processor logic core for the power regulator circuit detects a load level on the power supply unit DC output voltage.

7. The power supply unit operating a light load efficiency control system of claim 6, wherein the processor logic core for the power regulator circuit establishes the high step bulk capacitor voltage level when the detected load level on the power supply unit DC output voltage exceeds a threshold load level for a normal load.

8. The power supply unit operating a light load efficiency control system of claim 7, further comprising:
an integrated circuit amplifier configured to buffer the received control input voltage representative of the AC input voltage.

9. The power supply unit operating a light load efficiency control system of claim 6, wherein the processor logic core for the power regulator circuit establishes the low step bulk capacitor voltage level when the detected load level on the power supply unit DC output voltage is below a threshold load level and designated a light load.

10. A method of operating a light load efficiency control system comprising:
receiving, a control input voltage at a comparator integrated circuit representative of an AC input voltage received by a power supply unit;
comparing via the comparator integrated circuit the control input voltage to a reference voltage generated to represent a threshold level of AC input voltage;
activating a light load control feedback signal if the control input voltage exceeds the reference voltage level; and
transmitting the control signal feedback to a processor logic core to transition a plural stage bulk capacitor voltage level from a low step bulk capacitor voltage level to a high step bulk capacitor voltage level for a power factor correction circuit operating in a light load condition to reduce distortion in a DC output voltage of the power supply unit.

11. The method of operating a light load efficiency control system of claim 10, further comprising:
buffering the received control input voltage representative of the AC input voltage.

12. The method of operating a light load efficiency control system of claim 10, further comprising:
activating a transistor to alter the control signal feedback to the processor logic core to transition the plural stage bulk capacitor voltage level from the low step bulk capacitor voltage level to the high step bulk capacitor voltage level,
wherein the control signal feedback is a feedback voltage level that is altered and detected by the processor logic core.

13. The method of operating a light load efficiency control system of claim 10, wherein the control signal feedback is a feedback voltage level that is generated by the light load efficiency control system.

14. The method of operating a light load efficiency control system of claim 10, wherein the threshold level of AC input voltage is $240V_{AC}$.

15. A power supply unit operating a light load efficiency control system comprising:
a power regulator circuit for receiving an alternating current (AC) input voltage from within a range of accommodated AC input voltages including a power factor correction (PFC) circuit and an LLC resonator circuit having a bulk capacitance voltage level and operable to receive the input AC voltage in the power supply unit;
the power supply unit generating a direct current (DC) output voltage for use by a load;
a processor logic core for the power regulator circuit to control a plural stage bulk capacitor voltage level having at least a high step bulk capacitor voltage level for operation when a normal load is applied to the power supply unit and a low step bulk capacitor voltage level for operation under light load conditions; and
a light load control circuit for receiving a control input voltage representative of the AC input voltage received by the power supply unit, comparing via a comparator circuit the control input voltage to a reference voltage generated to represent a threshold level of AC input voltage, and activating a light load control feedback signal to the processor logic core if the control input voltage exceeds the reference voltage level under light load operating conditions.

16. The power supply unit operating a light load efficiency control system of claim 15, further comprising:
the processor logic core transitioning the plural stage bulk capacitor voltage level from a low step bulk capacitor voltage level to a high step bulk capacitor voltage level upon receiving the light load control feedback signal from the light load control circuit to avoid ringing in the DC output voltage.

17. The power supply unit operating a light load efficiency control system of claim 15, wherein the light load control feedback signal is a feedback voltage level changed by the light load control circuit and the changed feedback voltage level is detected by the processor logic core.

18. The power supply unit operating a light load efficiency control system of claim 15, further comprising:
the processor logic core detecting a load level on the power supply unit DC output voltage; and
the processor logic core for the power regulator circuit establishes the high step bulk capacitor voltage level when the detected load level on the power supply unit DC output voltage exceeds a threshold load level for a normal load.

19. The power supply unit operating a light load efficiency control system of claim 18, wherein the processor logic core for the power regulator circuit establishes the low step bulk capacitor voltage level when the detected load level on the power supply unit DC output voltage is below a threshold load level designated as a light load.

20. The power supply unit operating a light load efficiency control system of claim 15, wherein the reference voltage is generated to represent the threshold level of AC input voltage of 240 volts AC.

* * * * *